Figure 4:
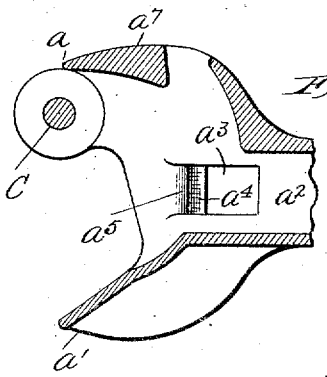

No. 12,679. REISSUED AUG. 6, 1907.
W. S. SCHROEDER.
CAR COUPLING.
APPLICATION FILED APR. 27, 1907.
2 SHEETS—SHEET 1.
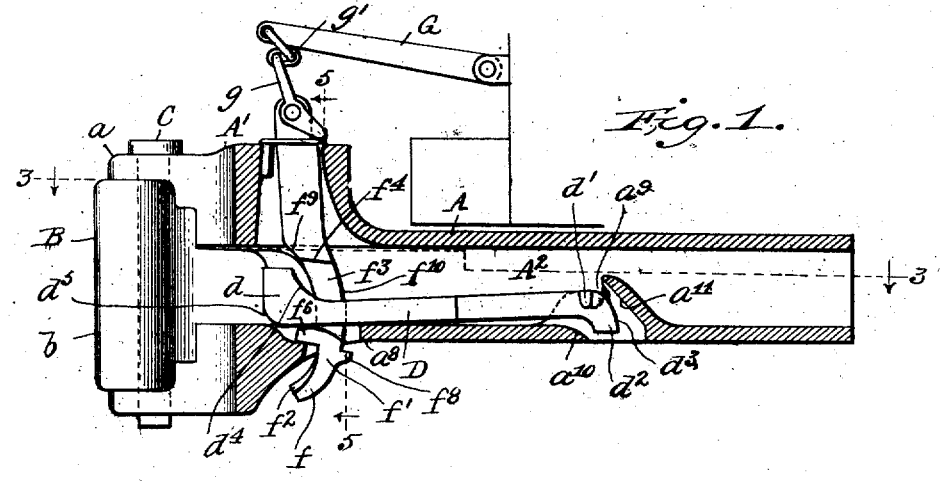
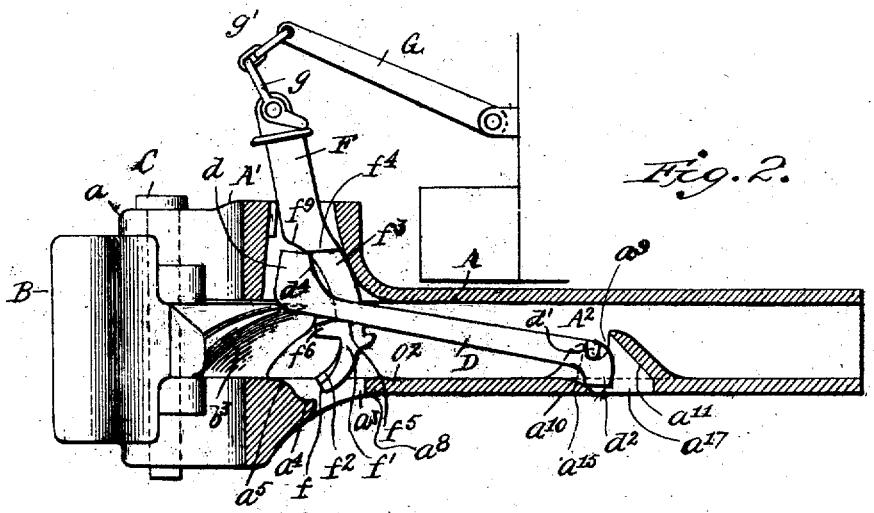
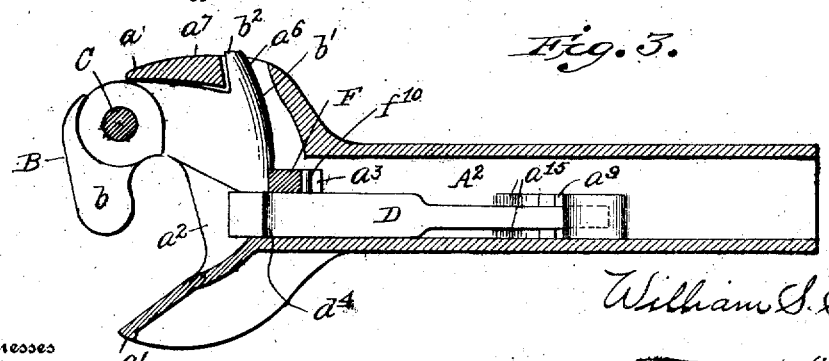
Witnesses
Walter M. Fuller
S. N. Pond
Inventor
William S. Schroeder
By Offield Towle & Lutticum
Attorneys No. 12,679. REISSUED AUG. 6, 1907.

W. S. SCHROEDER.

CAR COUPLING.

APPLICATION FILED APR. 27, 1907.

2 SHEETS—SHEET 2.

Inventor

William S. Schroeder

Witnesses

Walter M. Fuller

S. N. Pond

By Offield Towle & Linthicum

Attorneys

UNITED STATES PATENT OFFICE.

WILLIAM S. SCHROEDER, OF CHICAGO, ILLINOIS, ASSIGNOR, BY DIRECT AND MESNE ASSIGNMENTS, TO AMERICAN STEEL FOUNDRIES, OF JERSEY CITY, NEW JERSEY, A CORPORATION OF NEW JERSEY.

CAR-COUPLING.

No. 12,679. Specification of Reissued Letters Patent. Reissued Aug. 6, 1907.

Original No. 830,857, dated September 11, 1906, Serial No. 314,368. Application for reissue filed April 27, 1907. Serial No. 370,737.

*To all whom it may concern:*

Be it known that I, WILLIAM S. SCHROEDER, a citizen of the United States, residing at Chicago, in the county of Cook and State of Illinois, have invented certain new and useful Improvements in Car-Couplers, of which the following is a specification.

My invention relates to improvements in car-couplers, and more particularly to improvements in car-couplers of the kind employing a longitudinal locking-bar lying lengthwise in the chamber of the draw-bar and pivotally mounted at its rear end therein and provided with a lifting-pin for raising the front end of the locking-bar.

The object of my invention is to provide a car-coupler of this kind or class which will be of a strong, simple, efficient, and durable construction and at the same time have means for setting the lock in position for coupling and also for uncoupling and also means for throwing the knuckle automatically open and in which these functions may be performed or results accomplished without increasing the number of parts or pieces composing the coupler.

My invention consists in the means I employ to practically accomplish this object or result—that is to say, it consists, in connection with the draw-bar, pivoted knuckle, longitudinal locking-bar, and lifting pin, in providing the rear arm or tail of the knuckle with an upwardly-extending knuckle-throwing incline or cam-surface and in providing the lifting-pin, which has a notch on its right side to receive the front end of the locking-bar, with a lock-set extension at its lower end adapted to engage a lock-set shoulder on the floor of the draw-head and support the lock in position for uncoupling, said lock-set extension projecting downwardly and forwardly and having an upwardly and backwardly extending knuckle-throwing incline or cam-surface adapted to engage the coöperating knuckle-throwing incline or cam-surface on the rear arm or tail of the knuckle, and thus throw the knuckle open when the lifting-pin is raised to the required extent.

My invention further consists in providing the lifting-pin at its back near its lower end with a shoulder or projection adapted to engage the lower web or floor of the draw-head, and thus, in coöperation with the other parts, prevent the lock from creeping or moving upward excepting when the lock is lifted by the lifting-pin.

My invention also consists in the novel construction of parts and devices and in the novel combinations of parts and devices herein shown and described.

Figure 6:
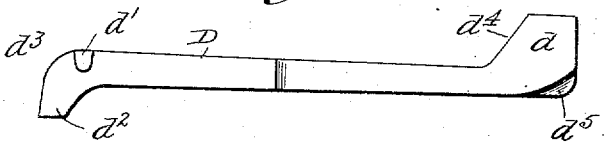
Figure 5:
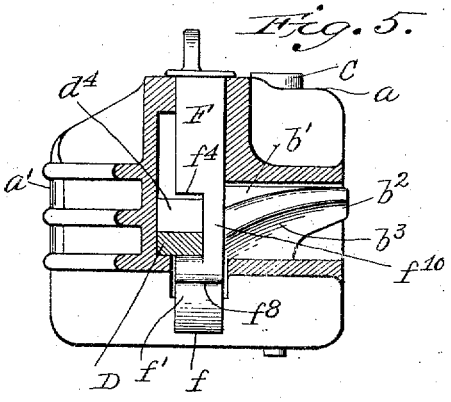
Figure 7:
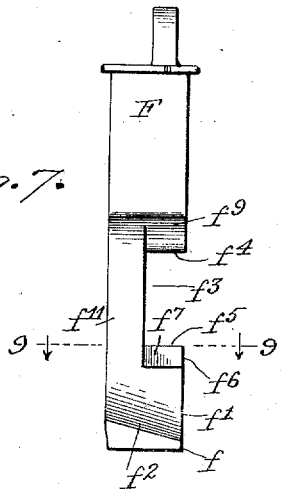
Figure 8:
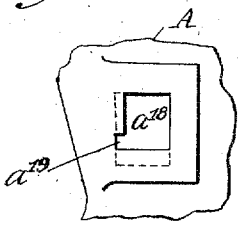
Figure 9:
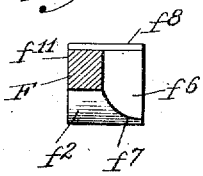

In the accompanying drawings, forming a part of this specification; Figure 1 is a central vertical longitudinal section of a car-coupler embodying my invention. Fig. 2 is a similar view showing the knuckle thrown open ready for coupling. Fig. 3 is a horizontal section on line 3 3 of Fig. 1. Fig. 4 is a detail horizontal section of the draw-head with the knuckle, lock, and locking pin removed. Fig. 5 is a cross section on line 5 5 of Fig. 1. Fig. 6 is a detail side elevation of the locking pin. Fig. 7 is a detail front elevation of the lifting-pin; and Fig. 8 is a detail partial plan view of the draw-head, showing the opening therein for the lifting-pin. Fig. 9 is a section on line 9 9 of Fig. 7.

In the drawings, A represents the draw-bar; A′, the draw-head, having the customary pivot-arm $a$ and guard-arm $a'$; B, the knuckle; C, the pivot-pin; D, the longitudinal locking-bar lying lengthwise in the hollow chamber $A^2$ of the draw-bar; F, the lifting-pin, and G the lifting-lever.

The bottom web or floor $a^2$ of the draw-head has an opening $a^3$ therein for the lower end of the lifting-pin to project through, and at the front side of this opening there is provided a lock-set ledge or shoulder $a^4$, adapted to engage the lock-set toe or edge $f$ of the lock-set extension $f'$ of the lifting-pin F, and thus set or hold the lock in position for uncoupling. The front side of the opening $a^3$ in the bottom wall or floor of the draw-head is also furnished with an upwardly and forwardly extending inclined or curved face $a^5$ to enable the lock-set extension $f'$ of the lifting-pin F to project forward into contact with the knuckle tail when the lifting-pin is lifted above its lock-set position to throw said knuckle open.

The knuckle B has the customary front arm or nose $b$ and rear arm or tail $b'$, furnished with the customary hook or projection $b^2$, fitting in a recess or opening $a^6$ in the draw-head and engaging a corresponding shoulder $a^7$ on the draw-head to afford an additional anchorage for the knuckle in the draw-head when the knuckle is closed and partially relieve the pivot-pin C from strain. The rear arm or tail $b'$ of the knuckle is also provided on its under side with upwardly-extending knuckle-throwing incline or cam-surface $b^3$, adapted to be engaged by the coöperating upwardly and rearwardly extending knuckle-throwing incline or cam-surface $f^2$, and thus throw the knuckle open when the lifting pin is lifted by the lifting-lever G above the lock-set position and its lower end tilted forward against the knuckle tail and its upper end backward, as is done when the lifting pin is thus raised to the required extent. The lifting-pin F is provided with a notch, recess, or cut-away portion $f^3$ in its right side to receive the front end $d$ of the longitudinal locking-bar D, and thus cause the front end of the locking-bar to be raised by the lifting-pin. This notch or recess $f^3$ in the lock forms an upper shoulder $f^4$, which fits above the locking-bar and a lower shoulder $f^5$, which fits below the locking-bar and engages it to raise it. The lower shoulder $f^5$ has a forwardly-projecting lip $f^6$, which is provided with a curved, beveled, or inclined face $f^7$, adapted to be engaged by the rear arm or tail $b'$ of the knuckle when the knuckle swings open under a pull thereon, and thus dislodge the lifting-pin or its lock-set toe $f$ from the lock-set ledge or shoulder $a^4$ on the draw-head, and thus cause the lock itself to rest directly upon the rear arm or tail of the knuckle and be set or supported in position for coupling when the knuckle again swings shut. The lifting-pin F is also provided near its lower end at its back with a lock-creeping-prevention shoulder or projection $f^8$, which is adapted to engage the edge $a^8$ of the draw-head at the rear side of the lifting-pin opening therein when the lifting-pin is in its lowermost position, and thus hold the lock in its lowermost position and prevent its accidentally moving upward.

The longitudinal locking-bar D has an integral pivot-lug $d'$ at its rear end fitting in a coöperating notch or bearing $a^9$ in the lock pivot-lugs $a^{15}$ of the draw-head. The locking-bar D is also provided with a curved foot or dog $d^2$ at its extreme rear end, furnished with a cam or curved surface $d^3$, the foot or dog $d^2$ fitting in a corresponding opening or recess $a^{17}$ in the bottom wall of the draw-bar, which is furnished with curved or inclined faces $a^{10}$ and $a^{11}$, so that the locking-bar D may have a slight longitudinal or forward and backward movement. The front end of the locking-bar fits loosely in the notch or recess $f^3$ of the lifting-pin F, so that the lifting-pin may move forward at its lower end in respect to the locking-bar and so that the locking-bar may also have a slight longitudinal movement lengthwise of the draw-bar independent of the locking-pin. The front end $d$ of the locking-bar D is furnished with an inclined or beveled shoulder $d^4$, which engages a coöperating beveled shoulder $f^9$ on the lifting-pin F to aid in throwing the lower end of the lifting-pin backward when the lock D while in the locking position starts to move upward under a creeping movement, thus causing the lock-creeping-prevention shoulder on the lifting-pin to properly engage the coöperating shoulder on the draw-head to keep or hold these parts in proper engagement. The front end $d$ of the lock D is also provided with a curved, beveled, or inclined face $d^5$ at its extreme front corner, which engages or rides upon the upper face of the rear arm or tail of the knuckle and facilitates the dropping of the lock into position when the knuckle closes.

The opening $a^{18}$ in the upper face of the draw-head is provided with a notch $a^{19}$ to accommodate the forwardly-projecting inclined lip $f^6$ at the lower end of the lifting-pin F, and thus enable the lifting-pin to be removed from the draw-head.

The lifting-lever G is connected to the lifting-pin F by a clevis $g$ and link $g'$.

The rear face of the lifting-pin F is backwardly curved or inclined, as shown at $f^{10}$, and its front face at $f^{11}$ correspondingly curved or inclined, the former curve or incline $f^{10}$ serving to throw the lower end of the lifting-pin forward against the knuckle tail as it is raised in the knuckle opening operation, and the latter-mentioned curve or incline $f^{11}$ serving to give more room for the rear arm or tail of the knuckle as it swings open.

I claim:

1. In a car-coupler, the combination with the draw-bar and draw-head, of a knuckle having a rear arm or tail furnished with a knuckle-throwing cam or incline on its under face, a longitudinally-extending locking-bar in the chamber of the draw-bar, and a vertically-movable lifting-pin having a notch or recess on one side to receive and engage the front end of the locking-bar, and provided with a downwardly and forwardly projecting lock-set extension furnished with a knuckle-throwing cam or incline engaging said knuckle-throwing cam or incline on the rear arm or tail of the knuckle, substantially as specified.

2. In a car-coupler, the combination with the draw-bar and draw-head, of a knuckle having a rear arm or tail furnished with a knuckle-throwing cam or incline on its under face, a longitudinally-extending locking-bar in the chamber of the draw-bar, and a vertically-movable lifting-pin having a notch or recess on one side to receive and engage the front end of the locking-bar, and provided with a downwardly and forwardly projecting lock-set extension furnished with a knuckle-throwing cam or incline engaging said knuckle-throwing cam or incline on the rear arm or tail of the knuckle, said lifting-pin having also at its back near its lower end a shoulder engaging the bottom web or floor of the draw-head to prevent the lock from creeping, substantially as specified.

3. In a car-coupler, the combination with the draw-bar and draw-head, of a knuckle having a rear arm or tail furnished with a knuckle-throwing cam or incline on its under face, a longitudinally-extending locking-bar in the chamber of the draw-bar, and a vertically-movable lifting-pin having a notch or recess on one side to receive and engage the front end of the locking-bar, and provided with a downwardly and forwardly projecting lock-set extension furnished with a knuckle-throwing cam or incline engaging said knuckle-throwing cam or incline on the rear arm or tail of the knuckle, the bottom web or floor of the draw-head having a lock-set ledge or shoulder adapted to be engaged by the toe or edge of said lock-set extension of the lifting pin, substantially as specified.

4. In a car-coupler, the combination with the draw-bar and draw-head, of a knuckle having a rear arm or tail furnished with a knuckle-throwing cam or incline on its under face, a longitudinally-extending locking-bar in the chamber of the draw-bar, and a vertically-movable lifting-pin having a notch or recess on one side to receive and engage the front end of the locking-bar, and provided with a downwardly and forwardly projecting lock-set extension furnished with a knuckle-throwing cam or incline engaging said knuckle-throwing cam or incline on the rear arm or tail of the knuckle, the bottom web or floor of the draw-head having a lock-set ledge or shoulder adapted to be engaged by the toe or edge of said lock-set extension of the lifting-pin, said lifting-pin having also a forwardly-projecting lip furnished with an inclined face adapted to be engaged by the knuckle-tail when the knuckle swings open and thus dislodge the lifting-pin from its lock-set position, substantially as specified.

5. In a car-coupler, the combination of a draw-head and draw-bar, with a knuckle, a longitudinally movable locking-bar lying lengthwise in the hollow or chamber of the draw-bar and having a pivotal connection therewith at its rear end, and a lifting-pin having a notch or recess on one side to receive the front end of the locking-bar and provided with an extension at its lower end having a curved or inclined face to engage the knuckle-tail and throw the knuckle open, substantially as specified.

6. In a car-coupler, the combination of a draw-head and draw-bar, with a knuckle, a longitudinally-movable locking-bar lying lengthwise in the hollow or chamber of the draw-bar and having a pivotal connection therewith at its rear end, and a lifting-pin having a notch or recess on one side to receive the front end of the locking-bar and provided with an extension at its lower end having a curved or inclined face to engage the knuckle-tail and throw the knuckle open, the knuckle-tail having a coöperating incline or cam, substantially as specified.

7. In a car-coupler, the combination of a draw-head and draw-bar, with a knuckle, a longitudinally-movable locking-bar lying lengthwise in the hollow or chamber of the draw-bar and having a pivotal connection therewith at its rear end, and a lifting-pin having a notch or recess on one side to receive the front end of the locking-bar and provided with an extension at its lower end having a curved or inclined face to engage the knuckle-tail and throw the knuckle open, the knuckle-tail having a coöperating incline or cam, the lower shoulder of the lifting-pin formed by the notch or recess therein having a forwardly-projecting lip provided with an inclined face, substantially as specified.

8. In a car-coupler, the combination of a draw-head and draw-bar, with a knuckle, a longitudinally-movable locking-bar lying lengthwise in the hollow or chamber of the draw-bar and having a pivotal connection therewith at its rear end, and a lifting-pin having a notch or recess on one side to receive the front end of the locking-bar and provided with an extension at its lower end having a curved or inclined face to engage the knuckle-tail and throw the knuckle open, the lifting-pin being also provided with a shoulder to prevent creeping of the lock, substantially as specified.

9. In a car coupler, the combination of a draw-head and draw-bar, with a knuckle, a longitudinally-movable locking-bar lying lengthwise in the hollow or chamber of the draw-bar and having a pivotal connection therewith at its rear end, and a lifting-pin having a notch or recess on one side to receive the front end of the locking-bar and provided with a projecting lip and an extension at its lower end having a curved or inclined face to engage the knuckle-tail and throw the knuckle open, the knuckle-tail having a coöperating incline or cam, the lifting-pin being also provided with a shoulder to prevent creeping of the lock and said lip on the lifting-pin coöperating with the draw-head to hold said creeping-prevention shoulder in engagement with the draw-head, substantially as specified.

10. In a car-coupler, the combination with a draw-head, and a draw-bar, of a knuckle, a longitudinally-extending locking-bar, and a vertically-movable lifting-pin adapted to tilt forward at its lower end and backward at its upper end, when lifted to throw the knuckle open and provided with a knuckle-throwing extension at its lower end, said extension of the lifting-pin having an inclined or curved face to engage the rear arm or tail of the knuckle, substantially as specified.

11. In a car coupler, the combination with the draw-head, of a knuckle, a longitudinally-extending locking-bar in the chamber of the draw-head, and a vertically-movable lifting-pin engaging the front end of the locking-bar, and provided at its lower end with a downwardly and forwardly projecting lock-set extension adapted to engage the draw-head when said lifting pin is raised.

12. In a car-coupler, the combination of a draw-head and draw-bar, with a knuckle, a locking-bar lying lengthwise in the hollow or chamber of the draw-bar, and a lifting-pin engaging the front end of the locking-bar and provided with a curved or inclined face to engage the knuckle-tail and throw the knuckle open.

13. In a car-coupler, the combination of a draw-head, and draw-bar, with a knuckle, a locking-bar lying lengthwise in the hollow or chamber of the draw-bar, and a lifting-pin engaging the front end of the locking-bar and provided at its lower end with a curved or inclined face to engage the knuckle-tail and throw the knuckle open.

14. In a car-coupler, the combination of a draw-head, and draw-bar, with a knuckle, a locking-bar lying lengthwise in the hollow or chamber of the draw-bar, and a lifting-pin engaging the front end of the locking-bar and provided with an extension at its lower end having a curved or inclined face to engage the knuckle-tail and throw the knuckle open.

15. In a car-coupler, the combination of a draw-head, and draw-bar, with a knuckle having a rear arm or tail furnished with a knuckle-throwing cam or incline on its under face, a locking-bar lying lengthwise in the hollow or chamber of the draw-bar, and a lifting-pin engaging the front end of the locking-bar and provided at its lower end with a curved or inclined face to engage the cam or incline on the knuckle-tail to throw said knuckle open.

16. In a car coupler, the combination of a draw-head, and draw-bar, with a knuckle having a rear arm or tail furnished with a knuckle-throwing cam or incline on its under face, a locking-bar lying lengthwise in the hollow or chamber of the draw-bar, and a lifting-pin engaging the front end of the locking-bar and provided with an extension at its lower end having a curved or inclined face to engage the cam or inclined face on the knuckle-tail and throw said knuckle open.

17. In a car-coupler, the combination of a draw-head, and draw-bar, with a knuckle, a locking-bar lying lengthwise in the hollow or chamber of the draw-bar, and a lifting-pin engaging the front end of the locking-bar and provided with an extension at its lower end having a curved or inclined face to engage the knuckle-tail and throw the knuckle open, the knuckle-tail having a coöperating incline or cam.

18. In a car-coupler, the combination of a draw-head and draw-bar, with a knuckle, a locking-bar lying lengthwise in the hollow or chamber of the draw-bar, and a lifting-pin engaging the front end of the locking-bar and provided with an extension at its lower end having a curved or inclined face to engage the knuckle-tail and throw the knuckle open, the knuckle-tail having a coöperating incline or cam, the lower shoulder of the lifting-pin formed by the notch or recess therein having a forwardly-projecting lip provided with an inclined face.

19. In a car-coupler, the combination of a draw-head and draw-bar, with a knuckle, a locking-bar lying lengthwise in the hollow or chamber of the draw-bar, and a lifting-pin engaging the front end of the locking-bar and provided with an extension at its lower end having a curved or inclined face to engage the knuckle-tail and throw the knuckle open, the lifting-pin being also provided with a shoulder to prevent creeping of the lock.

20. In a car-coupler, the combination with the draw-bar and draw-head, of a knuckle having a rear arm or tail furnished with a knuckle-throwing cam or incline on its under face, a longitudinally-extending locking-bar in the chamber of the draw-bar, and a vertically-movable lifting-pin engaging the front end of the locking-bar, and provided with a downwardly and forwardly projecting lock-set extension furnished with a knuckle-throwing cam or incline engaging said knuckle-throwing cam or incline on the rear arm or tail of the knuckle.

21. In a car-coupler, the combination with the draw-bar and draw-head, of a knuckle having a rear arm or tail furnished with a knuckle-throwing cam or incline on its under face, a longitudinally-extending locking-bar in the chamber of the draw-bar, and a vertically-movable lifting-pin engaging the front end of the locking-bar, and provided with a downwardly and forwardly projecting lock-set extension furnished with a knuckle-throwing cam or incline engaging said knuckle-throwing cam or incline on the rear arm or tail of the knuckle, said lifting-pin having also at its back near its lower end a shoulder engaging the bottom web or floor of the draw-head to prevent the lock from creeping.

22. In a car-coupler, the combination with the draw-bar and draw-head, of a knuckle having a rear arm or tail furnished with a knuckle-throwing cam or incline on its under face, a longitudinally-extending locking-bar in the chamber of the draw-bar, and a vertically-movable lifting-pin engaging the front end of the locking-bar, and provided with a downwardly and forwardly projecting lock-set extension furnished with a knuckle-throwing cam or incline engaging said knuckle-throwing cam or incline on the rear arm or tail of the knuckle, the bottom web or floor of the draw-head having a lock-set ledge or shoulder adapted to be engaged by the toe or edge of said lock-set extension of the lifting-pin.

23. In a car-coupler, the combination with the draw-bar and draw-head, of a knuckle having a rear arm or tail furnished with a knuckle-throwing cam or incline on its under face, a longitudinally-extending locking-bar in the chamber of the draw-bar, and a vertically-movable lifting-pin engaging the front end of the locking-bar, and provided with a downwardly and forwardly projecting lock-set extension furnished with a knuckle-throwing cam or incline engaging said knuckle-throwing cam or incline on the rear arm or tail of the knuckle, the bottom web or floor of the draw-head having a lock-set ledge or shoulder adapted to be engaged by the toe or edge of said lock-set extension of the lifting-pin, said lifting-pin having also a forwardly-projecting lip furnished with an inclined face adapted to be engaged by the knuckle-tail when the knuckle swings open and thus dislodge the lifting-pin from its lock-set position.

24. In a car-coupler, the combination with a draw-head, a knuckle, a locking-bar for retaining said knuckle in the closed position, and a lifting-pin for said locking-bar having a shoulder adapted to engage said draw-head, to prevent upward creeping of the lifting pin of coöperating inclines on said locking-bar and lifting-pin adapted, when said locking-bar moves upward under a creeping movement to force said shoulder on said lifting-pin into engagement with the draw-head, to lock the lifting-pin and locking-bar against further upward movement.

In testimony whereof, I have hereunto set my hand in the presence of two subscribing witnesses.

WILLIAM S. SCHROEDER.

Witnesses:

FREDERICK C. GOODWIN,
WALTER M. FULLER.